US012562492B2

(12) United States Patent
Vasanelli et al.

(10) Patent No.: US 12,562,492 B2
(45) Date of Patent: Feb. 24, 2026

(54) HORN ANTENNA DEVICE

(71) Applicant: Shenzhen Yinwang Intelligent Technologies Co., Ltd., Shenzhen (CN)

(72) Inventors: Claudia Vasanelli, Munich (DE); Jonathan Alvarez, Munich (DE); Simon Tejero Alfageme, Munich (DE); Jordi Balcells Ventura, Munich (DE); Sergio Duque Biarge, Munich (DE); Alberto Perez Monjas, Munich (DE)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/513,182

(22) Filed: Nov. 17, 2023

(65) Prior Publication Data

US 2024/0088567 A1 Mar. 14, 2024

Related U.S. Application Data

(63) Continuation of application No. PCT/EP2021/079773, filed on Oct. 27, 2021.

(51) Int. Cl.
*H01Q 13/02* (2006.01)
*H01Q 15/14* (2006.01)

(52) U.S. Cl.
CPC ........... *H01Q 13/02* (2013.01); *H01Q 15/142* (2013.01)

(58) Field of Classification Search
CPC .......... H01Q 1/38; H01Q 13/10; H01Q 13/18; H01Q 15/14; H01Q 1/2283; H01Q 13/02; H01Q 1/22; H01Q 1/32; H01Q 15/142
See application file for complete search history.

(56) References Cited

U.S. PATENT DOCUMENTS 4,743,915 A * 5/1988 Rammos .............. H01Q 21/064 343/786
6,225,960 B1 5/2001 Collins
(Continued)

FOREIGN PATENT DOCUMENTS

WO 9843314 A1 10/1998
WO WO-2008069369 A1 * 6/2008 ......... H01Q 13/0258

OTHER PUBLICATIONS

Topak et al., "Compact Topside Millimeter-Wave Waveguide-to-Microstrip Transitions," IEEE Microwave and Wireless Components Letters, vol. 23, No. 12, total 3 pages, Institute of Electrical and Electronics Engineers, New York, New York (Dec. 2013).
(Continued)

*Primary Examiner* — Alexander H Taningco
(74) *Attorney, Agent, or Firm* — Leydig, Voit & Mayer, Ltd.

(57) ABSTRACT

A horn antenna device is disclosed that comprises: a plastic body comprising a top face, a bottom face opposing the top face and lateral faces adjoining the top face and the bottom face; and a cavity formed in the plastic body, wherein the cavity comprises a cavity opening formed at the top face of the plastic body, wherein the cavity is at least partially coated with a metal layer to form a horn antenna for radiating microwaves through the cavity opening, wherein the plastic body is partially coated with the metal layer, and wherein the metal layer being configured to define a radiation characteristic of the horn antenna.

20 Claims, 11 Drawing Sheets

(56) References Cited

U.S. PATENT DOCUMENTS

| | | | | |
|---|---|---|---|---|
| 6,573,873 | B2 * | 6/2003 | Lier | H01Q 19/08 343/781 R |
| 9,899,722 | B2 * | 2/2018 | Saraf | H01Q 21/064 |
| 10,333,209 | B2 * | 6/2019 | Schmalenberg | H01Q 1/3283 |
| 10,826,166 | B2 | 11/2020 | Chen et al. | |
| 2003/0179148 | A1 * | 9/2003 | Ohlsson | H01Q 19/09 343/786 |
| 2006/0158382 | A1 * | 7/2006 | Nagai | H01Q 21/0037 343/786 |
| 2009/0212996 | A1 * | 8/2009 | Chen | H01Q 13/02 342/124 |
| 2009/0303147 | A1 | 12/2009 | Choudhury | |
| 2013/0099989 | A1 * | 4/2013 | Pantea | H01Q 13/0208 343/783 |
| 2017/0018836 | A1 * | 1/2017 | Ito | G01S 13/88 |
| 2018/0166786 | A1 * | 6/2018 | Kozyrev | H01Q 13/02 |
| 2019/0020120 | A1 * | 1/2019 | Kamo | H01Q 19/08 |
| 2019/0107429 | A1 * | 4/2019 | Waelde | G01S 13/88 |
| 2019/0260107 | A1 * | 8/2019 | Baur | H01Q 13/02 |
| 2020/0313304 | A1 * | 10/2020 | Glogowski | H01Q 21/0037 |

OTHER PUBLICATIONS

Yao et al., "Isolation Enhancement for W-Band Coplanar Array Antennas Based on Silicon Micromachining Technology," IEEE Antennas and Wireless Propagation Letters, vol. 19, No. 10, total 5 pages, Institute of Electrical and Electronics Engineers, New York, New York (Oct. 2020).

* cited by examiner

310

311

HORN ANTENNA DEVICE

CROSS-REFERENCE TO RELATED APPLICATIONS

This application is a continuation of International Application No. PCT/EP2021/079773, filed on Oct. 27, 2021, the disclosure of which is hereby incorporated by reference in its entirety.

TECHNICAL FIELD

The present disclosure relates to the field of antenna design for automotive radars. In particular, the disclosure relates to a horn antenna device and antenna system using such horn antenna devices as receiving and transmitting antennas. More particularly, the disclosure relates to a partially metalized horn antenna array for an automotive radar.

BACKGROUND

Currently, automotive radars work in the 76 GHz-77 GHz sub-band, e.g., according to ETSI EN 301 091-2 standardization, but for future high-resolution radars using the whole assigned bandwidth until 81 GHz becomes important. The planar microstrip antennas currently used in radar sensors don't provide a sufficient large bandwidth. For this reason, the current trend on the market is to focus on horn antennas, which are well-known wideband radiators with stable radiation properties.

When using horn antennas in a radar system, some drawbacks must be considered. First of all, when multiple horn antennas are placed side by side, they show a strong mutual coupling, since the antennas are aligned along the maximum of their electric field. The second critical point is the degradation of the antenna radiation pattern. Indeed, when the horn antennas are fabricated as an opening in a large metalized block, the antenna radiation pattern can show strong ripples. In particular, the large metallic area at the antenna aperture generates the typical interference pattern in the electric field amplitude, due to the diffraction by the finite size of the metallization. In turn, this causes ripples in the radiation pattern. This problem affects typically the H-plane sectoral horns, so those horn antennas with the walls flared only in the H-plane of the waveguide.

SUMMARY

This disclosure provides a solution for a radar system using a novel design of a horn antenna, that can overcome the above-described disadvantages of available horn antenna designs.

In particular, a novel horn antenna design is disclosed that shows reduced ripples in the antenna radiation pattern and reduced mutual coupling when two horn antennas are placed side-by-side.

The foregoing and other objects are achieved by the features of the independent claims. Further implementation forms are apparent from the dependent claims, the description and the figures.

The disclosure provides a solution to both the problems of the mutual coupling between horn antennas and the presence of unwanted ripples in the radiation pattern.

The disclosure addresses the two fundamental issues mentioned above. It introduces the use of horn antennas based on metal coated plastic, but instead of completely shielding the plastic, as used in currently available solutions, part of the plastic material is exposed without any metallization. In this way, the antenna design has an additional degree of freedom, since the dielectric properties of the plastic can affect now the antenna performance.

The disclosure introduces a novel antenna system suitable for the series development of automotive radar sensors. The antenna system works in the frequency band between 76 GHz and 81 GHz, e.g., according to the specification of ITU-R M.2057.1 or ETSI EN 302 264, and it is a surface mountable device that can be directly connected to the printed circuit board (PCB) by means or screws or by soldering. In this antenna system the basic radiators are H-plane horn antennas, which show a wide bandwidth. The horn antennas are first formed in a plastic material, by means of injection molding or 3D printing, for example and then metallized, for example with electroplating or vapor deposition.

The plastic block, in which the horn antennas have been formed, is not completely covered by the metal coating, but part of the plastic material is still exposed. This feature allows to better control the antenna performance, in particular to: 1) Reduce the ripples in the azimuth plane; and 2) Reduce the mutual coupling between adjacent antennas.

The dielectric properties of the plastic are additional design parameters to control the antenna performance.

The principle described in this disclosure, namely the use of a partially metallized structure combined with the use of horn antennas, can be used in any antenna configuration suitable for a MIMO radar. Both 1D and 2D antenna arrangement can be developed with this technology. The same principle can be extended to different radiators, such as open-ended waveguides, and also to antenna elements placed in an array configuration.

The following benefits can be achieved by using this horn antenna design for example in an automotive radar sensor. The smooth radiation pattern obtained with the help of the partial metallization can help to relax the requirements on the antenna system calibration, which is a potentially expensive and time-consuming task in the automotive radar series development. Moreover, the reduction of the mutual coupling, also obtained by exploiting the advantage of the partial metallization, is important in a radar system. For example, a strong coupling between transmitter and receiver can cause leakage in the receiver chain and block the detection of a target placed at a short distance with respect to the radar which can be significantly reduced when using the novel horn antenna design described in this disclosure.

According to a first aspect, the disclosure relates to a horn antenna device, comprising: a plastic body comprising a top face, a bottom face opposing the top face and lateral faces adjoining the top face and the bottom face; and a cavity formed in the plastic body, wherein the cavity comprises a cavity opening formed at the top face of the plastic body, wherein the cavity is at least partially coated with a metal layer to form a horn antenna for radiating microwaves through the cavity opening; wherein the plastic body is partially coated with the metal layer, the metal layer being configured to define a radiation characteristic of the horn antenna.

Such a horn antenna device provides the advantage of a smooth radiation pattern obtained with the help of the partial metallization. Besides mutual coupling with other horn antennas placed close to the horn antenna can be reduced by exploiting the advantage of the partial metallization.

In an exemplary implementation of the horn antenna device, the metal layer is configured to interact with surface parts of the plastic body exposing the plastic without any metallization to define the radiation characteristic of the horn antenna.

This provides the advantage that interaction of the metal layer with the exposed parts of the plastic body allows to design the horn antenna to reduce ripples in the radiation pattern and to reduce unwanted mutual coupling of neighboring horn antennas.

In an exemplary implementation of the horn antenna device, dielectric properties of the plastic of the plastic body are configured to define the radiation characteristic of the horn antenna.

This provides the advantage that the horn antenna design has an additional degree of freedom, since the dielectric properties of the plastic can affect now the antenna performance.

In an exemplary implementation of the horn antenna device, the metal layer is formed to define the radiation characteristic of the horn antenna with respect to a minimum size of ripples in an azimuth plane of the horn antenna.

This provides the advantage that the partially covered metal layer can be optimally designed in order to minimize ripples in the radiation pattern, thereby improving the performance of the horn antenna device.

In an exemplary implementation of the horn antenna device, the metal layer is formed to define the radiation characteristic of the horn antenna with respect to a minimum mutual coupling of the horn antenna with an adjacent horn antenna.

This provides the advantage that the partially covered metal layer can be optimally designed in order to minimize mutual coupling with adjacent horn antennas, thereby improving the performance of the horn antenna device.

In an exemplary implementation of the horn antenna device, the bottom face of the plastic body is coated with the metal layer; and the top face and the lateral faces of the plastic body are exposing the plastic without any metallization.

This provides the advantage that the horn antenna device is easy to be manufactured, since no metallization is required for the top face and the lateral faces. The metallization of the bottom face can be used for mounting the horn antenna device on a printed circuit board.

In an exemplary implementation of the horn antenna device, the bottom face and at least one of the lateral faces of the plastic body are coated with the metal layer; and the top face of the plastic body is exposing the plastic without any metallization.

This provides the advantage that the metallization of at least one lateral face can be advantageously used to suppress extension of the electric field to neighboring devices, thereby improving electromagnetic interference performance. A further advantage of this partial coating is a better control of the radiation pattern with respect to a suppression of the possible spurious radiation from the lateral face.

In an exemplary implementation of the horn antenna device, the cavity in the plastic body comprises a bottom cavity opening formed at the bottom face of the plastic body to feed the horn antenna with a radiation signal.

This provides the advantage that the horn antenna device can be efficiently fed with the radiation signal by using the bottom cavity opening.

In an exemplary implementation of the horn antenna device, the plastic body comprises a groove formed at the bottom face, the groove extending from the bottom cavity opening towards one of the lateral faces, the groove forming a rectangular waveguide section.

This provides the advantage that the horn antenna device can be efficiently fed by a rectangular waveguide and a microstrip line on a printed circuit board coupled to the groove.

In an exemplary implementation of the horn antenna device, the plastic body is shaped in the form of a box comprising the top face, the bottom face and four lateral faces.

This provides the advantage that the horn antenna device has a compact design and can be easily produced, e.g. by 3D printing or other manufacturing methods.

In an exemplary implementation of the horn antenna device, the horn antenna device comprises: at least one second cavity formed in the plastic body, wherein the at least one second cavity comprises a second cavity opening formed at the top face of the plastic body, wherein the at least one second cavity is at least partially coated with the metal layer to form at least one second horn antenna for radiating microwaves through the second cavity opening, wherein the at least one second horn antenna is placed side by side with the horn antenna in the plastic body.

This provides the advantage that the horn antenna device can be efficiently applied in a MIMO configuration providing both, transmitting antennas and receiving antennas.

In an exemplary implementation of the horn antenna device, the at least one second horn antenna is placed laterally offset to the horn antenna in the plastic body.

This provides the advantage that the antenna performance can be improved when placing the horn antennas laterally offset with respect to each other.

In an exemplary implementation of the horn antenna device, the horn antenna device comprises: a plastic wall formed at the top face of the plastic body between the second cavity opening of the at least one second cavity and the cavity opening of the cavity, wherein the plastic wall is configured to suppress a mutual coupling between the horn antenna and the at least one second horn antenna.

This provides the advantage that the antenna radiation pattern can be improved.

In an exemplary implementation of the horn antenna device, the plastic wall is surrounding the second cavity opening of the at least one second cavity and/or the cavity opening of the cavity at the top face of the plastic body.

This provides the advantage that the plastic walls can be easily manufactured when they surround the cavities.

In an exemplary implementation of the horn antenna device, the horn antenna device comprises a plurality of holes, configured to: align the plastic body with a predefined positioning of the plastic body on a printed circuit board, fix the plastic body on the predefined positioning on the printed circuit board by mechanical fastening, and/or fix a mask on the plastic body for obtaining the partially coating of the plastic body with the metal layer during a metallization process.

This provides the advantage that the horn antenna device can be efficiently manufactured by using these holes to align the plastic body on a PCB, fix the plastic body on the PCB and fix the coating mask on the plastic body.

In an exemplary implementation of the horn antenna device, the horn antenna is configured to operate in a radar frequency band covering at least a bandwidth between 76 GHz and 81 GHz, e.g. according to the specification of ITU-R M.2057.1 or ETSI EN 302 264.

This provides the advantage that the horn antenna device can be efficiently used in automotive radar applications.

According to a second aspect, the disclosure relates to an antenna system, comprising: a printed circuit board; at least one first horn antenna device according to any of the preceding claims mounted on the printed circuit board, the at least one first horn antenna device being configured as a receiving antenna; at least one second horn antenna device according to any of the preceding claims mounted on the printed circuit board, the at least one second horn antenna device being configured as a transmitting antenna; and a monolithic microwave integrated circuit, MMIC, placed on the printed circuit board, the MMIC comprising a plurality of transmit channels coupled to the transmitting antenna and a plurality of receive channels coupled to the receiving antenna by means of feed lines.

Such an antenna system provides the advantage of a smooth radiation pattern obtained with the help of the partial metallization. Mutual coupling between the transmitting antennas and the receiving antennas can be reduced by exploiting the advantage of the partial metallization.

The MMIC can be placed on top side of the PCB, i.e., the same side on which the first and second horn antenna devices are mounted. In some implementations, multiple MMICs can be placed on the top side of the PCB. In some implementations, a shielding or enclosure that covers the MMIC or the multiple MMICs is mounted on the top side of the PCB above the MMIC or the multiple MMICs. I.e., the MMIC or the multiple MMICs can be placed on the top side of the PCB inside the shielding or enclosure.

In an exemplary implementation of the antenna system, the antenna system is configured to form a MIMO radar system comprising multiple receiving antennas and multiple transmitting antennas.

This provides the advantage of a high performance MIMO radar system which can accurately detect objects with high precision.

Different antenna arrangements can be applied, for example for performing angular measurements also in elevation and not only in azimuth. Most relevant configurations are 3×4 MIMO (3 transmitting antennas and 4 receiving antennas), 12×16 MIMO (12 transmitting antennas and 16 receiving antennas) and 12×24 MIMO (12 transmitting antennas and 24 receiving antennas). Other possible configurations are for example 6×8 MIMO, 9×12 MIMO, 15×20 MIMO, 18×26 MIMO, 2×3 MIMO, 4×6 MIMO, 6×9 MIMO, 8×12 MIMO, 2×2 MIMO, 3×3 MIMO, 4×4 MIMO, 8×8 MIMO, 12×12 MIMO, 16×16 MIMO, 32×32 MIMO, 48×48 MIMO, etc.

According to a third aspect, the disclosure relates to a method for producing a horn antenna device, the method comprising: providing a plastic body comprising a top face, a bottom face opposing the top face and lateral faces adjoining the top face and the bottom face; forming a cavity in the plastic body, wherein the cavity comprises a cavity opening formed at the top face of the plastic body; at least partially coating the cavity with a metal layer to form a horn antenna for radiating microwaves through the cavity opening; and partially coating the plastic body with the metal layer, the metal layer being configured to define a radiation characteristic of the horn antenna.

The advantages of the method are the same as those for the corresponding implementation forms of the horn antenna device and antenna system described above.

That means, such a method provides the advantage of easy manufacturing a horn antenna device with a smooth radiation pattern obtained with the help of the partial metallization. When producing the horn antenna device based on this method, a mutual coupling with other horn antennas placed close to the horn antenna can be reduced by exploiting the advantage of the partial metallization.

According to a fourth aspect, the disclosure relates to a computer program product including computer executable code or computer executable instructions that, when executed, causes at least one computer to execute the method according to the third aspect described above.

Such a computer program product can be implemented for example on a manufacturing machine, e.g., a controller of a 3D printer or a computer numerical control (CNC) of a manufacturing robot.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

In this disclosure, horn antennas and horn antenna devices are described. A horn antenna consists of a flared metal rectangular waveguide. A horn antenna is used to transmit radio waves from a waveguide, i.e., a metal pipe used to carry radio waves, out into space, or collect radio waves into a waveguide for reception. The horn antenna typically consists of a short length of rectangular or cylindrical metal tube, i.e., the waveguide, closed at one end, flaring into an open-ended conical or pyramidal shaped horn on the other end. The radio waves can be introduced into the waveguide by a coaxial cable or by a microstrip feeding network with the help of a microstrip-to-waveguide transition. The waves then radiate out the horn end in a narrow beam.

A common approach for fabricating a horn antenna is to mill the required shape within larger aluminum blocks. Afterwards the machined parts can be connected together, for example with screws.

To obtain a lightweight radar sensor, the horn antennas can be made from plastic, which is then covered by a thin metallization to assure the same high frequency performance as the original design. In existing horn antenna designs, the plastic is completely shielded by the metal and hence the dielectric properties of the material don't affect the wave propagation. In the novel horn antenna design as described in this disclosure, the plastic is only partially shielded by the metal which results in benefits regarding mutual coupling and ripples in the radiation pattern as described in this disclosure. The plastic structure can be obtained with the help of injection molding or 3D-printing, while the metal coating can be realized for instance with electroplating or vapor deposition techniques.

Figure 1:
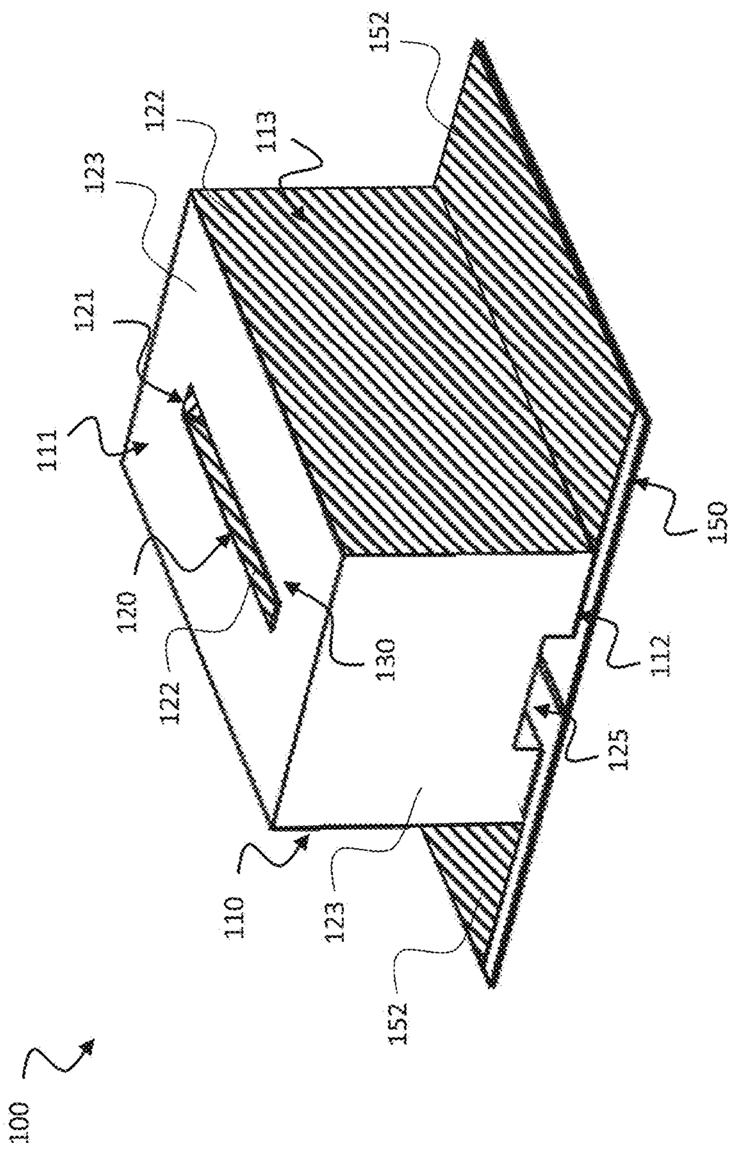
FIG. 1 shows a 3-dimensional view of a horn antenna device 100 according to a first embodiment.

FIG. 1 shows a 3-dimensional view of a horn antenna device 100 according to a first embodiment.

The horn antenna device 100 comprises a plastic body 110 comprising a top face 111, a bottom face 112 opposing the top face 111 and lateral faces 113 adjoining the top face 111 and the bottom face 112.

Figure 3A:
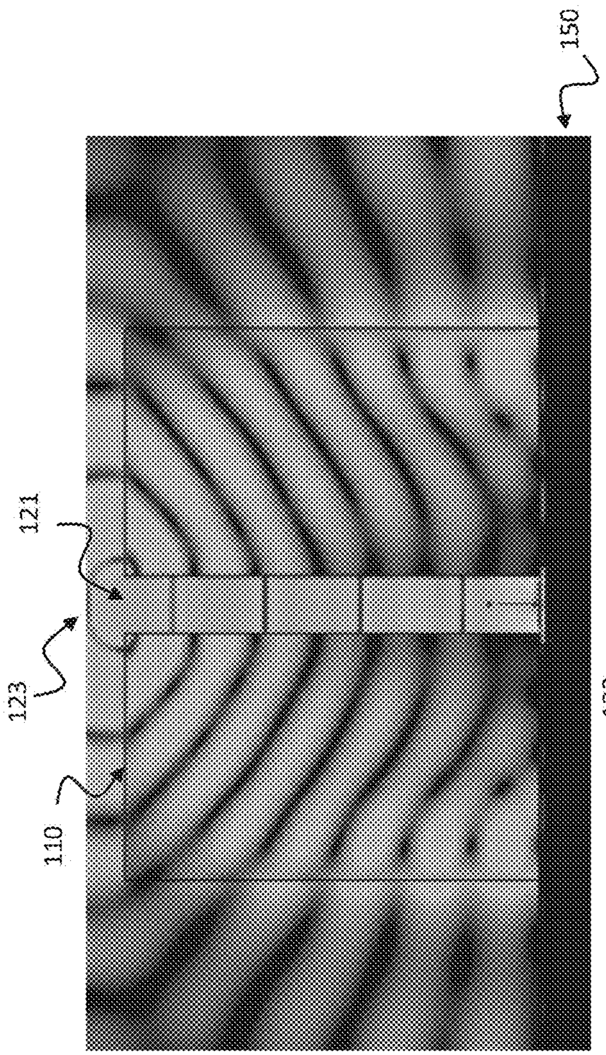
FIG. 3A shows a plot of the electric field amplitude 310 illustrating spurious radiation from the outer walls of a plastic block.
Figure 3B:
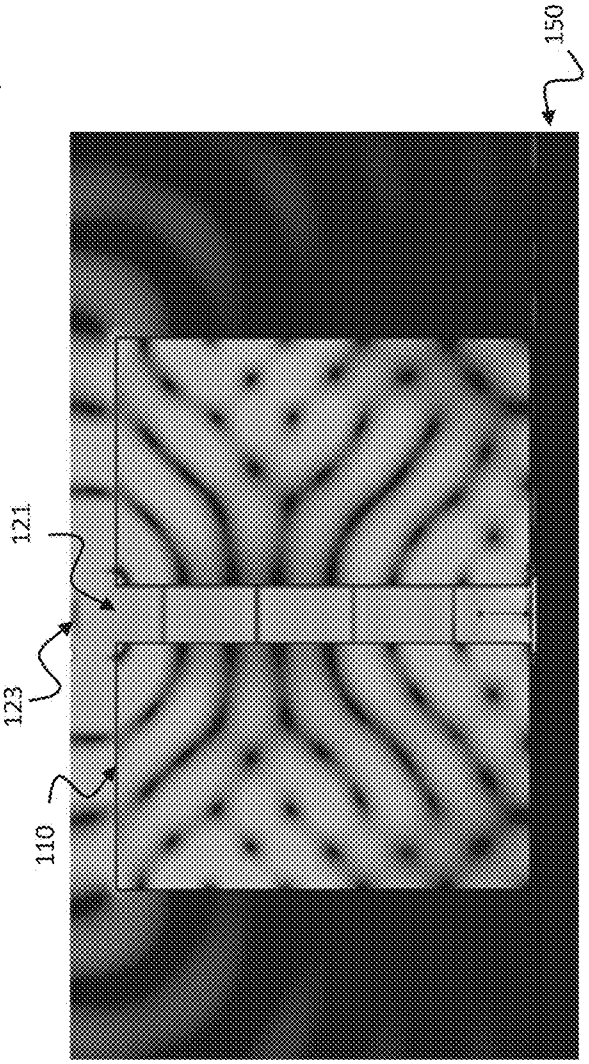
FIG. 3B shows a plot of the electric field amplitude 311 illustrating spurious radiation blocked by metallized walls of a horn antenna device 100 according to the first embodiment.

The horn antenna device 100 comprises a cavity 120 formed in the plastic body 110. The cavity 120 comprises a cavity opening 121 formed at the top face 111 of the plastic body 110. The cavity 120 is at least partially coated with a metal layer 122 to form a horn antenna 130 for radiating microwaves through the cavity opening 121. The plastic body 110 is partially coated with the metal layer 122 wherein the metal layer 122 is configured to define a radiation characteristic or radiation pattern of the horn antenna 130, e.g., a radiation characteristic 310, 311 as shown in FIGS. 3A and 3B.

The plastic body 110 may be formed, for example, by any plastic materials used with 3D printing such as ABS-like photopolymer, for example.

The horn antenna device 100 is mounted on a printed circuit board (PCB) 150. A metallization 152 of the PCB 150 can be seen in FIG. 1. The metallization 152 of the PCB 150 is different from the metal layer 122 that is partially coating the plastic body 110.

The metal layer 122 that is partially coating the plastic body 110 may be configured to interact with surface parts of the plastic body 110 exposing the plastic 123 without any metallization 122 to define the radiation characteristic 310, 311 of the horn antenna 130.

The dielectric properties of the plastic of the plastic body 110 may be configured to define the radiation characteristic 310, 311 of the horn antenna 130.

Figure 4:
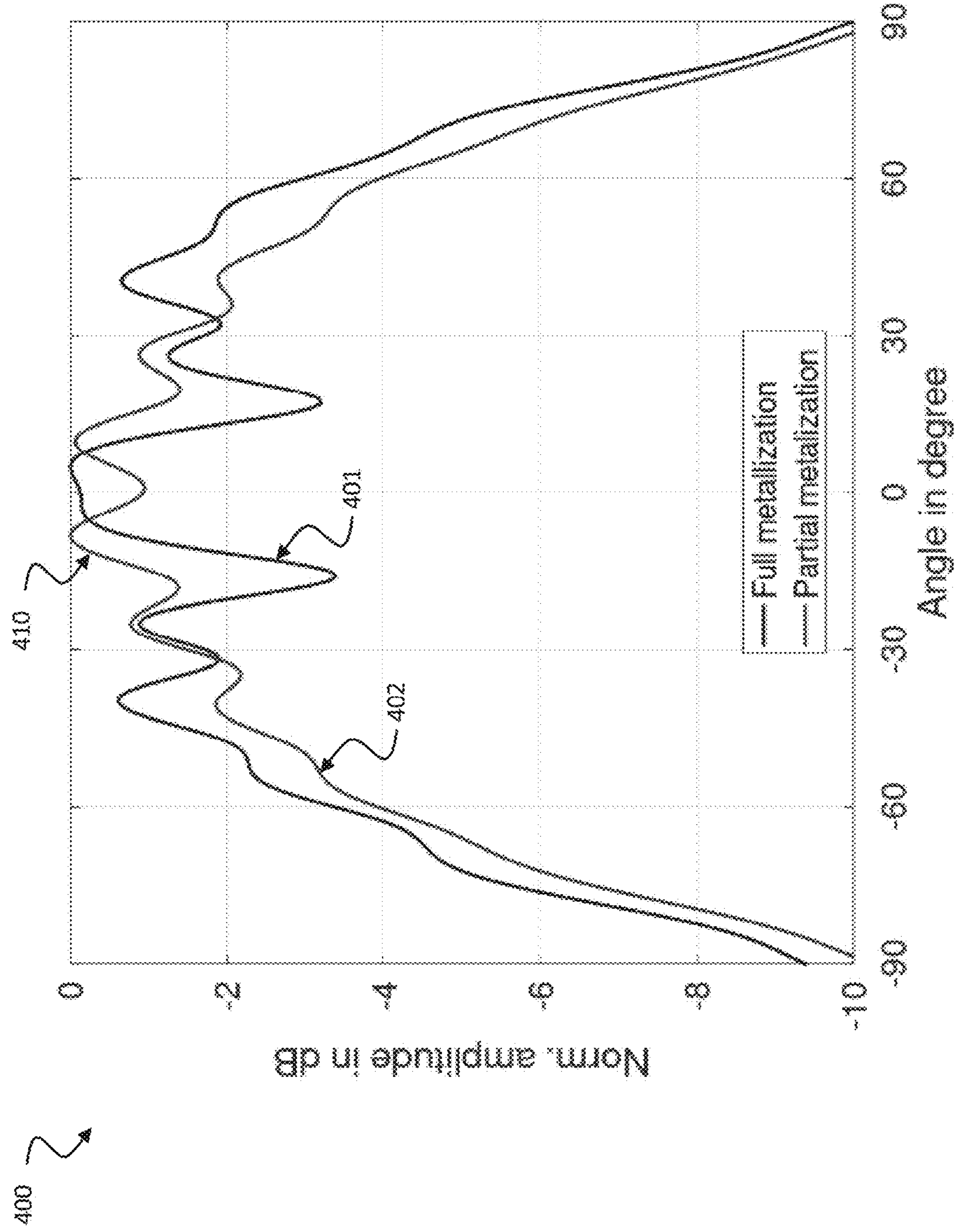
FIG. 4 shows a radiation diagram 400 illustrating radiation for a full metallization horn antenna device 401 compared to radiation for a partial metallization horn antenna device 402 according to disclosure.

The metal layer 122 may be formed to define the radiation characteristic 310, 311 of the horn antenna 130 with respect to a minimum size of ripples 410 in an azimuth plane of the horn antenna 130, e.g. as shown in FIG. 4.

The metal layer 122 may be formed to define the radiation characteristic 310, 311 of the horn antenna 130 with respect to a minimum mutual coupling of the horn antenna 130 with an adjacent horn antenna, e.g. an adjacent horn antenna as shown in the configurations described below with respect to FIGS. 7 to 10.

The bottom face 112 and at least one of the lateral faces 113 of the plastic body 110 may be coated with the metal layer 122 as can be seen from FIG. 1. The top face 111 of the plastic body 110 may expose the plastic 123 without any metallization 122.

Figure 6B:
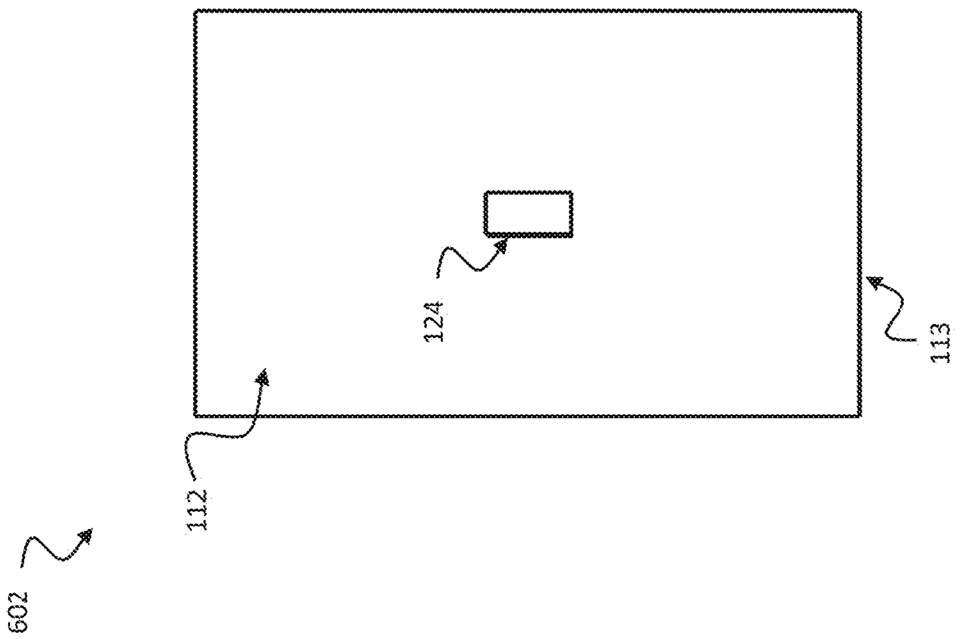
FIG. 6B shows a bottom view 602 of a horn antenna device according to the disclosure illustrating a waveguide transition at the bottom face.
Figure 6A:
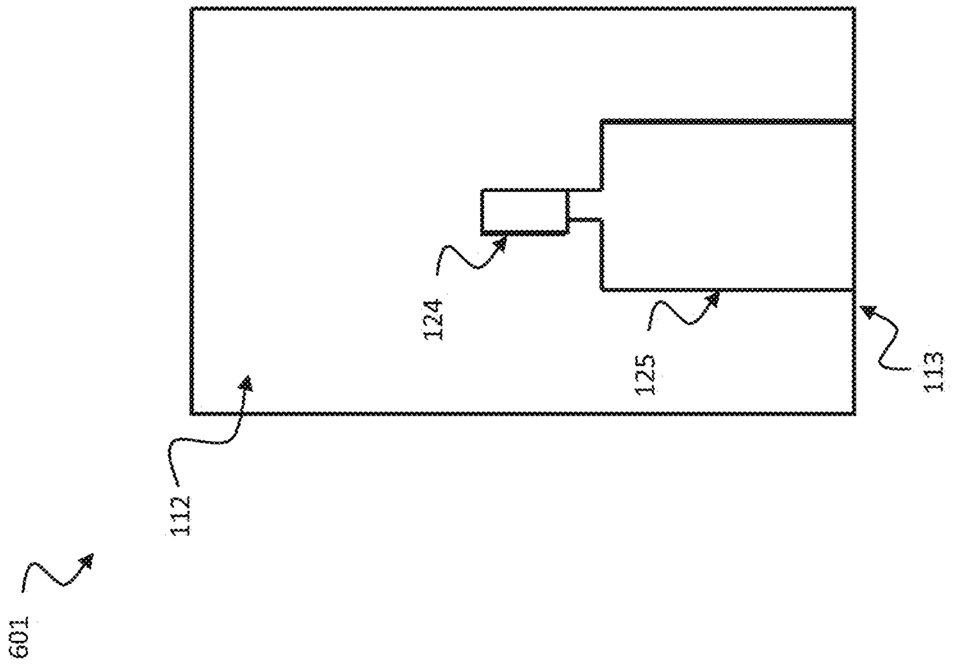
FIG. 6A shows a bottom view 601 of a horn antenna device according to the disclosure illustrating a waveguide-to-microstrip transition at the bottom face.

The cavity 120 in the plastic body 110 may comprise a bottom cavity opening 124 as shown in FIGS. 6A and 6B, formed at the bottom face 112 of the plastic body 110 to feed the horn antenna 130 with a radiation signal.

The plastic body 110 may comprise a groove 125 formed at the bottom face 112, the groove 125 extending from the bottom cavity opening 124 towards one of the lateral faces 113, e.g., as shown in FIGS. 6A and 6B. The groove 125 may be required for microstrip-to-waveguide transition. For example, a microstrip line may be placed on the PCB 150 below the groove 125. The groove 125 enables energy transition between the microstrip line and the waveguide.

The plastic body 110 may be shaped in the form of a box comprising the top face 111, the bottom face 112 and four lateral faces 113.

The horn antenna 130 may be configured to operate in a radar frequency band covering at least a bandwidth between 76 GHz and 81 GHz, e.g., according to the specification of ITU-R M.2057.1 or ETSI EN 302 264.

Figure 2:
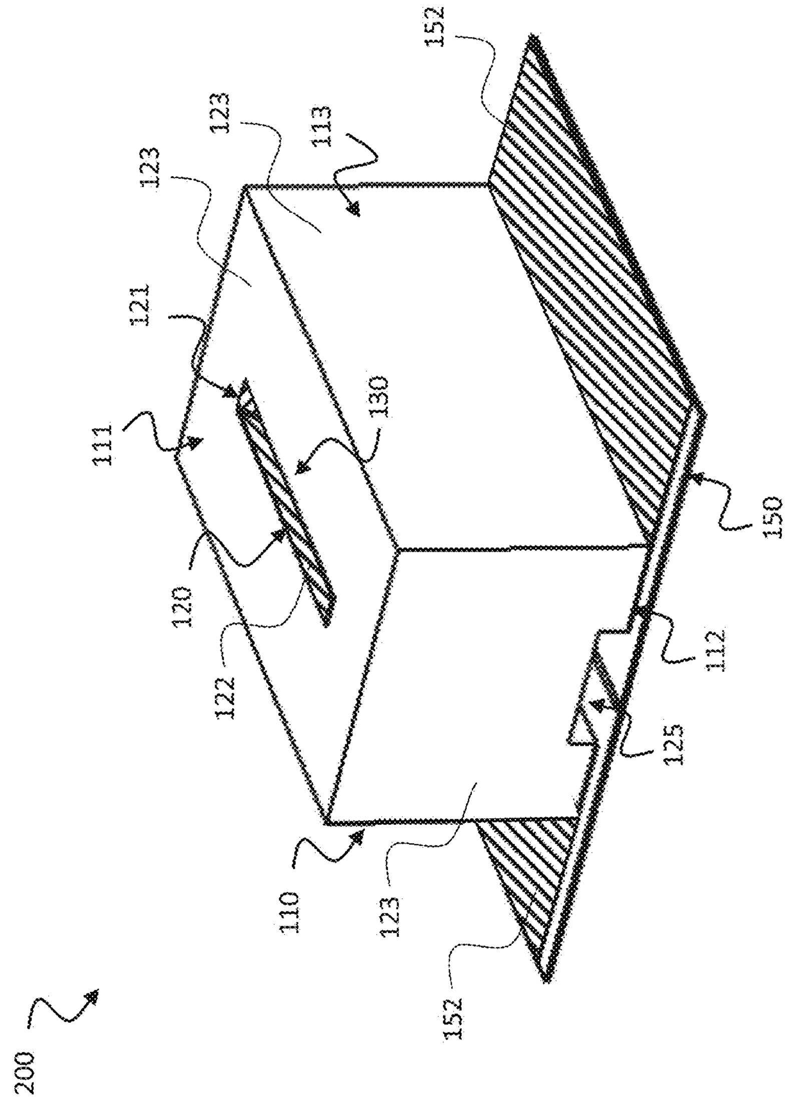
FIG. 2 shows a 3-dimensional view of a horn antenna device 200 according to a second embodiment.

FIG. 2 shows a 3-dimensional view of a horn antenna device 200 according to a second embodiment. The horn antenna device 200 corresponds to the horn antenna device 100 described above with respect to FIG. 1, but in this second embodiment, the partial covering of the plastic body with the metal layer 122 refers to the bottom face 112 of the plastic body. I.e., the bottom face 112 (not viewable in FIG. 2) is covered by the metal layer 122 while the lateral faces 113 are not covered by the metal layer 122.

That means, the bottom face 112 of the plastic body 110 may be coated with the metal layer 122 as shown in FIG. 2. The top face 111 and the lateral faces 113 of the plastic body 110 may expose the plastic 123 without any metallization 122.

Figure 8:
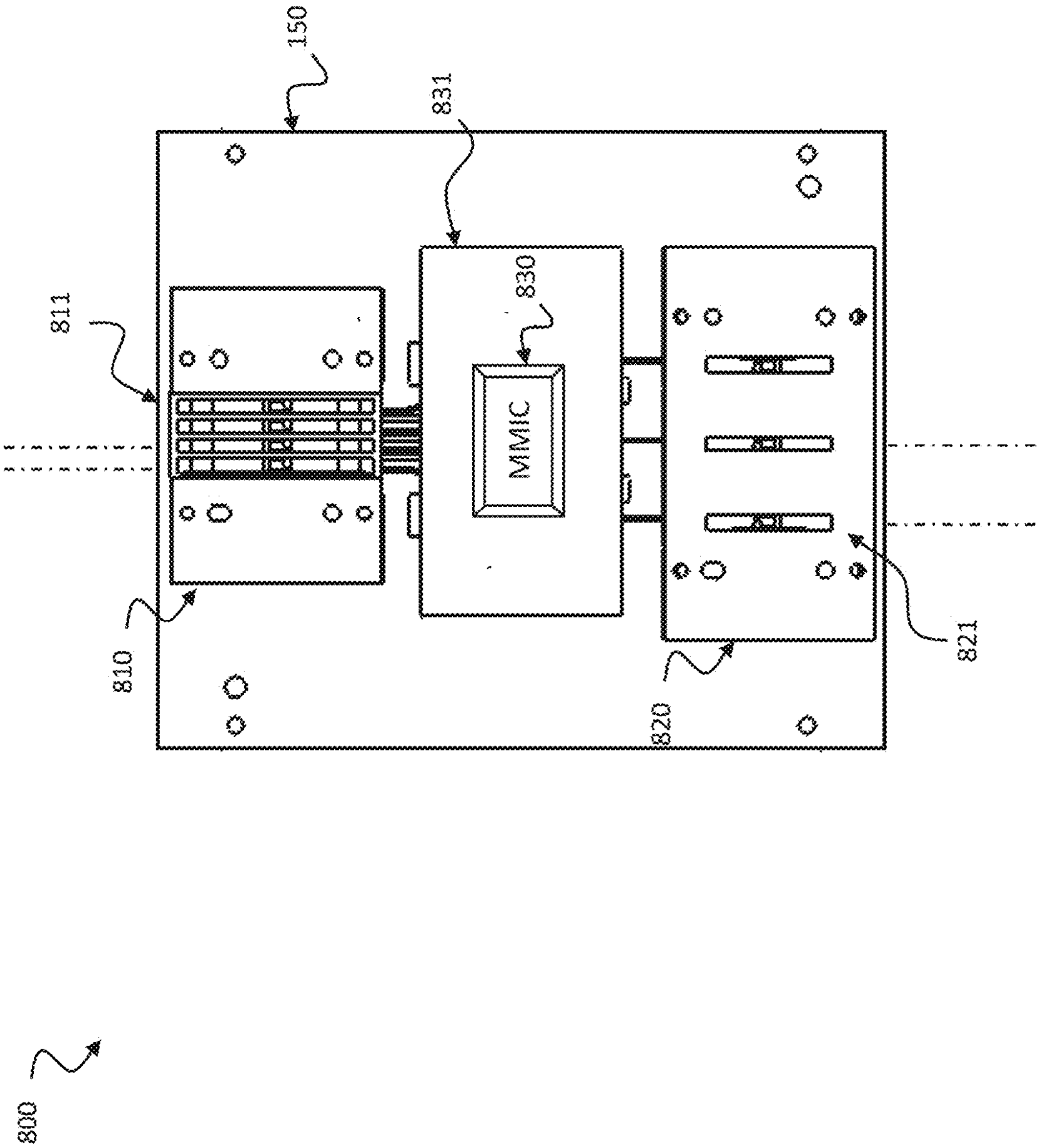
FIG. 8 shows a top view of an antenna system 800 according to an exemplary implementation.

As can be observed from FIG. 2, the antenna device 200 can be seen as surface mountable structure, since it can be mounted on the top surface of a PCB (printed circuit board) 150, on which one or multiple MMICs (monolithic microwave integrated circuit), e.g. as shown in FIG. 8, generate the high-frequency signal, which is then distributed to input port of the horn antennas by a microstrip feeding network. In FIG. 2, the following elements can be recognized: A) Plastic material 123 of the plastic body 110 or plastic block 110: This block can be realized with 3D printing or injection molding. B) Opening 121 or cavity opening 121 of the horn antenna 130: The inner walls of the horn are metallized 122; the metallization 122 can be performed by electroplating or vapor deposition. The bottom side 112 of the plastic block 110 is also metallized to allow the realization of a microstrip-to-waveguide transition. C) PCB 150. D) Feeding 125 to the input of the horn antenna 130 in microstrip technology.

FIG. 3A shows a plot of the electric field amplitude 310 illustrating spurious radiation from the outer walls of a plastic block. FIG. 3B shows a plot of the electric field amplitude 311 illustrating spurious radiation blocked by metallized walls of a horn antenna device 100 according to the first embodiment.

The metal layer 122 of the horn antenna device 100, 200 as described above with respect to FIGS. 1 and 2 is configured to define a radiation characteristic 310, 311 or radiation pattern of the horn antenna 130 as shown in the radiation diagrams 310 and 311.

Figure 7:
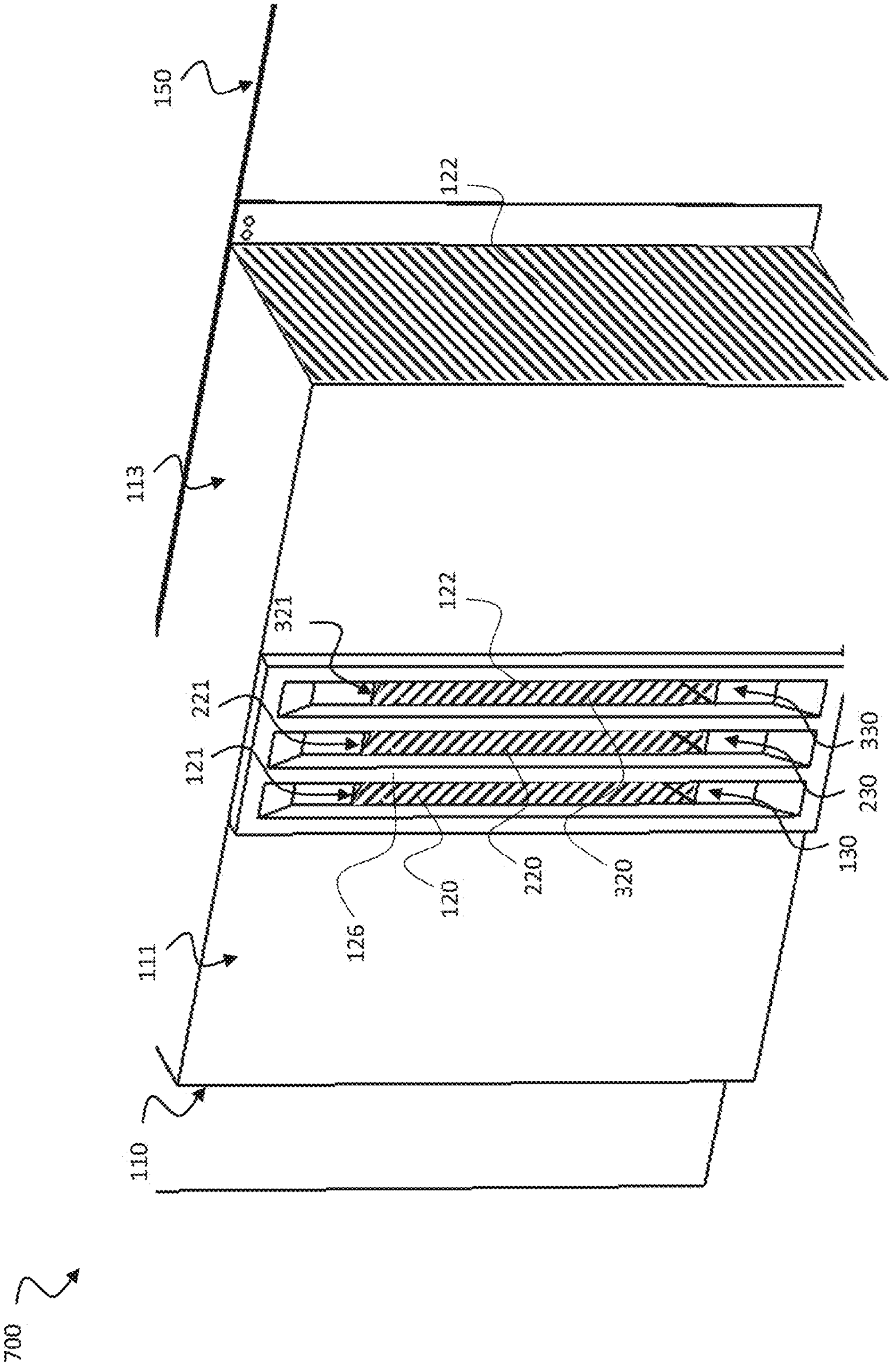
FIG. 7 shows a 3-dimensional view of a horn antenna device 700 according to the disclosure having multiple horn antennas placed side-by-side.

Depending on the relative dielectric permittivity of the plastic, a significant electromagnetic propagation through the plastic material can take place. To avoid a degradation of the antenna radiation pattern, in particular an increase in the ripples in the azimuth plane, the external walls 126 of the plastic block 110, as shown in the configuration of FIG. 7 described below, can be metallized too. This can stop the spurious radiation from the side of the plastic structure.

Diagram 310 shows radiation of a horn antenna device 200 according to the configuration shown in FIG. 2 described below, where the outer walls of the plastic block 110 are not metallized. In contrast, diagram 311 shows radiation of a horn antenna device 100 where the outer walls are metallized. This results in a radiation concentration inside the plastic block 110 and a damped radiation characteristic outside the plastic block 110.

As described above with respect to FIG. 1, the metal layer 122 that is partially coating the plastic body 110, may be configured to interact with surface parts of the plastic body 110 exposing the plastic 123 without any metallization 122 to define the radiation characteristic 310, 311 of the horn antenna 130.

As described above with respect to FIG. 1, the dielectric properties of the plastic of the plastic body 110 may be configured to define the radiation characteristic 310, 311 of the horn antenna 130.

FIG. 4 shows a radiation diagram 400 illustrating radiation for a full metallization horn antenna device 401 compared to radiation for a partial metallization horn antenna device 402 according to disclosure. From FIG. 4 can be observed that ripples of the full metallization horn antenna device 401 are more pronounced than ripples 410 of the partial metallization horn antenna device 402.

Thanks to the partial metallization, the dielectric properties of the plastic material can be exploited to improve the radiation performance of the horn antenna. The dielectric loss (tan δ) of the plastic attenuates the currents that cause the diffraction due to finite size of the structure. The radiation pattern of the antenna is hence improved, since the fluctuations 410 in the amplitude of the radiation pattern can be reduced with only a small loss in the realized antenna gain, compared to the fully metalized case 401. The improvement can be clearly seen in FIG. 4; the amplitude of the ripples 410 is reduced in the partial metallized case 402 compared to the original antenna design based on the full metallization 401.

The metal layer 122 of the horn antenna device 100, 200 may be formed to define the radiation characteristic 310, 311 of the horn antenna 130 with respect to a minimum size of ripples 410 in an azimuth plane of the horn antenna 130 as shown in FIG. 4.

Figure 5:
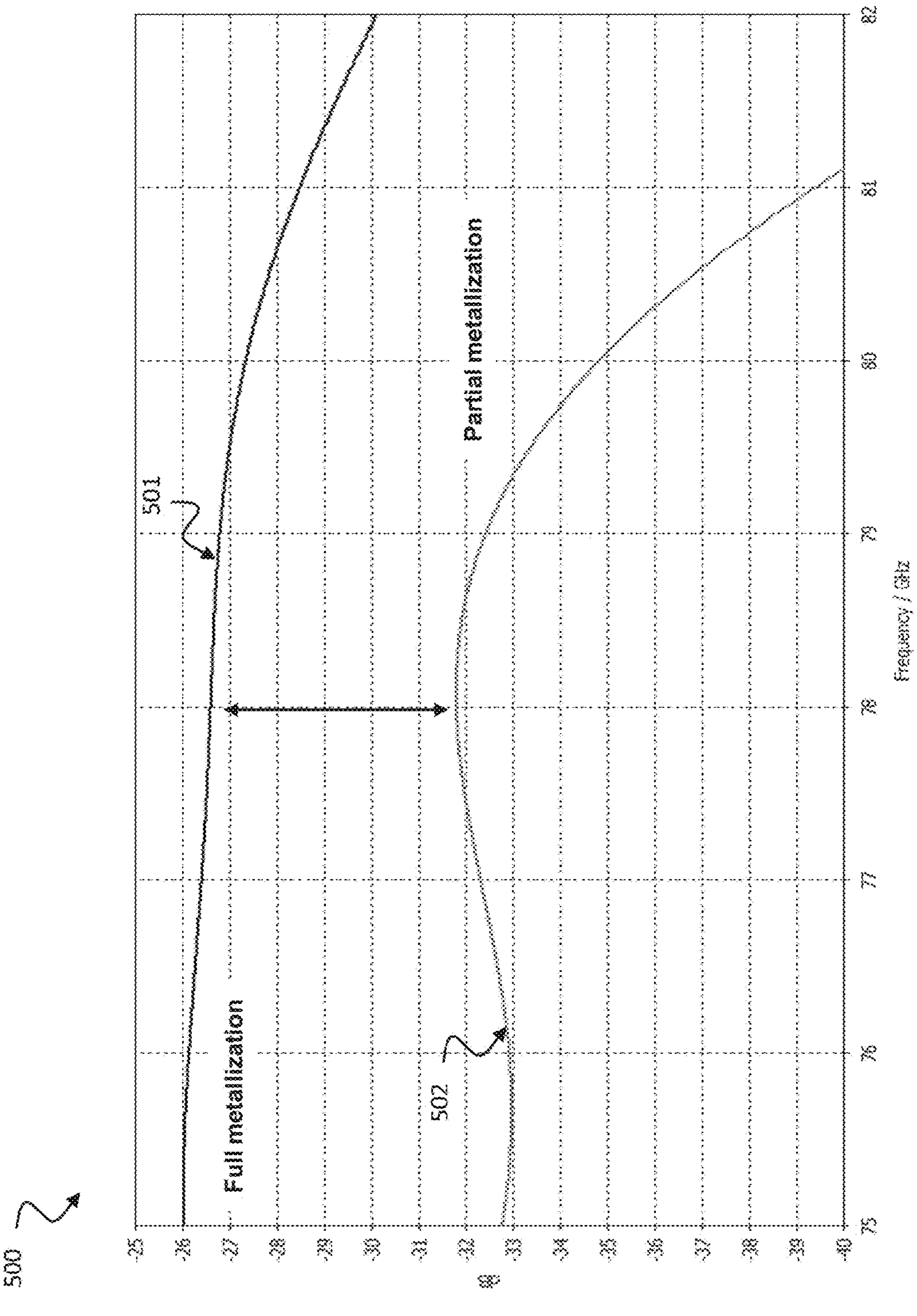
FIG. 5 shows a performance diagram 500 illustrating mutual coupling for the full metallization horn antenna device 501 compared to mutual coupling for the partial metallization horn antenna device 502 according to disclosure.

FIG. 5 shows a performance diagram 500 illustrating mutual coupling for the full metallization horn antenna device 501 compared to mutual coupling for the partial metallization horn antenna device 502 according to disclosure.

The plastic dielectric loss not only can improve the shape of the azimuth radiation pattern, but also the amount of mutual coupling between adjacent antennas. This effect can be seen with the help of the example in FIG. 5. The picture represents the mutual coupling between two horn antennas placed at a distance of 7.4 mm obtained by means of full-wave simulations. The partial-metallized design 502 is compared with the full-metallized design 501, and it can be seen that with the solution according to the disclosure, i.e., partial metallization 502, the mutual coupling can be reduced by approximately 5 dB. The plastic material has been modeled in the electromagnetic simulation software with tan $\delta$=0.042 and $\varepsilon_r$=2.6. These are the dielectric properties of one common material for 3D printing and this material serves here just as an example.

The reduction of the mutual coupling, thanks to the plastic dielectric losses, can be easily detected when plotting the maximum amplitude of the electric field in the full-metallized and in the partial metallized version of two horn antennas placed side by side. In such a scenario, the amplitude of the electric field is lower around the victim antenna when a partial metallized structure is employed.

FIG. 6A shows a bottom view 601 of a horn antenna device according to the disclosure illustrating a waveguide-to-microstrip transition at the bottom face 112 and FIG. 6B shows a bottom view 602 of a horn antenna device according to the disclosure illustrating a waveguide transition at the bottom face 112.

The cavity 120 in the plastic body 110 as shown in FIGS. 1 and 2 may comprise a bottom cavity opening 124 as shown in FIGS. 6A and 6B, formed at the bottom face 112 of the plastic body 110 to feed the horn antenna 130 with a radiation signal.

As also shown in FIGS. 1 and 2, the plastic body 110 may comprises a groove 125 formed at the bottom face 112. The groove 125 may extend from the bottom cavity opening 124 towards one of the lateral faces 113 as shown in FIG. 6A. The groove 125 may be required for microstrip-to-waveguide transition as described above with respect to FIG. 1.

In FIG. 6B, there is no groove, the bottom cavity opening 124 shown in FIG. 6B forms a waveguide transition at the bottom face 112.

FIG. 7 shows a 3-dimensional view of a horn antenna device 700 according to the disclosure having multiple horn antennas placed side-by-side, e.g., at a distance of half free-space wavelength or less. The horn antenna device 700 may correspond to the horn antenna device 100 described above with respect to FIG. 1 or the horn antenna device 200 described above with respect to FIG. 2, but it includes multiple horn antennas placed side-by-side in the plastic body 110 which are surrounded by outer walls 126.

That means, the horn antenna device 700 comprises at least one second cavity 220, 320 formed in the plastic body 110, in FIG. 7 an exemplary number of three horn antennas 130, 230, 330 are implemented.

The at least one second cavity 220, 320 comprises a second cavity opening 221, 321 formed at the top face 111 of the plastic body 110. The at least one second cavity 220, 320 is at least partially coated with the metal layer 122 to form at least one second horn antenna 230, 330 for radiating microwaves through the second cavity opening 221, 321.

The at least one second horn antenna 230, 330 is placed side by side with the horn antenna 130 in the plastic body 110.

The at least one second horn antenna 230, 330 may be placed laterally offset to the horn antenna 130 in the plastic body 110 (not shown in FIG. 7).

The horn antenna device 700 comprises a plastic wall 126 formed at the top face 111 of the plastic body 110 between the second cavity opening 221, 321 of the at least one second cavity 220, 320 and the cavity opening 121 of the cavity 120. The plastic wall 126 is configured to suppress a mutual coupling between the horn antenna 130 and the at least one second horn antenna 230, 330.

The plastic wall 126 may surround the second cavity opening 221, 321 of the at least one second cavity 220, 320 and/or the cavity opening 121 of the cavity 120 at the top face 111 of the plastic body 110 as shown in FIG. 7. Alternatively, the plastic walls 126 may be placed between the respective cavities 120, 220, 320 without fully surrounding these cavities, e.g., they may be shaped as straight bars or bridges.

In many automotive radar sensors, it is required to place the transmitting or radiating antennas at a small distance, typically half free-space wavelength or less. In this case, the distance is too small to appreciate the impact of the plastic dielectric losses on the antenna mutual coupling. To still reduce the coupling also in this condition, this disclosure introduces the use of thin plastic walls 126 between adjacent antennas, as depicted in FIG. 7. The plastic walls 126 reduce the mutual coupling by approximately 2.5 dB compared to the case without the use of plastic walls.

The antenna system described in this disclosure is suitable for MIMO (multiple-input multiple-output) radars with both 1D and 2D imaging capabilities as shown in FIG. 8 below. Indeed, the use of the partial metallization does not pose any restriction on the antenna placement; hence, this solution can be employed in both 1D and 2D imaging radars, depending on the sensor specifications.

The partial metallization can also be used for different shapes of the radiating element, such as open-ended waveguides, or also for radiating elements within an array configuration.

FIG. 8 shows a top view of an antenna system 800 according to an exemplary implementation.

The antenna system 800 comprises a printed circuit board 150; at least one first horn antenna device 810, e.g., corresponding to the horn antenna devices 100, 200 described above with respect to FIGS. 1 and 2, that is mounted on the printed circuit board 150. The at least one first horn antenna device 810 may be configured as a receiving antenna.

The antenna system 800 comprises at least one second horn antenna device 820, e.g., corresponding to the horn antenna devices 100, 200 described above with respect to FIGS. 1 and 2, that is mounted on the printed circuit board 150. The at least one second horn antenna device 820 may be configured as a transmitting antenna, for example.

The antenna system 800 further comprises a monolithic microwave integrated circuit (MMIC) 830 placed on the printed circuit board 150. The MMIC comprises a plurality of transmit channels coupled to the transmitting antenna and a plurality of receive channels coupled to the receiving antenna by means of feed lines.

The antenna system 800 may be configured to form a MIMO radar system comprising multiple receiving antennas 811 and multiple transmitting antennas 821 as shown in FIG. 8.

In this example shown in FIG. 8, the antenna system 800 is applied to a 3×4 MIMO radar, i.e., with 3 transmitting antennas and 4 receiving antennas. The mentioned before, the antenna system 800 according to the disclosure can be generalized to any number of transmitters and receivers, and to any antenna configuration. FIG. 8 shows this model. Since the spacing among the receiving antennas 811 is small, the thin plastic walls described above with respect to FIG. 7 can be employed here.

In an exemplary configuration of the antenna system 800, the distance between the transmitting antennas 821 may be 7.40 mm (center to center). In an exemplary configuration of the antenna system 800, the distance between the receiving antennas 811 may be 1.85 mm (center to center).

The MMIC 830 can be placed on top side of the PCB 150, i.e., the same side on which the first and second horn antenna devices 810, 820 are mounted. In some implementations, multiple MMICs can be placed on the top side of the PCB 150. In some implementations, a shielding or enclosure 831 may cover the MMIC 830 or the multiple MMICs. Such shielding or enclosure 831 can be mounted on the top side of the PCB 150 above the MMIC 830 or the multiple MMICs. I.e., the MMIC or the multiple MMICs can be placed on the top side of the PCB 150 inside the shielding or enclosure 831.

The antenna system 800 may be configured to form a MIMO radar system comprising multiple receiving antennas 811 and multiple transmitting antennas 821 as shown in FIG. 8.

Different antenna arrangements can be applied, for example for performing angular measurements also in elevation and not only in azimuth. Most relevant configurations are 3×4 MIMO (3 transmitting antennas and 4 receiving antennas) as shown in FIG. 8, 12×16 MIMO (12 transmitting antennas and 16 receiving antennas) and 12×24 MIMO (12 transmitting antennas and 24 receiving antennas). Other possible configurations are 6×8 MIMO, 9×12 MIMO, 15×20 MIMO, 18×26 MIMO, 2×3 MIMO, 4×6 MIMO, 6×9 MIMO, 8×12 MIMO, 2×2 MIMO, 3×3 MIMO, 4×4 MIMO, 8×8 MIMO, 12×12 MIMO, 16×16 MIMO, 32×32 MIMO, 48×48 MIMO, etc.

Figure 9:
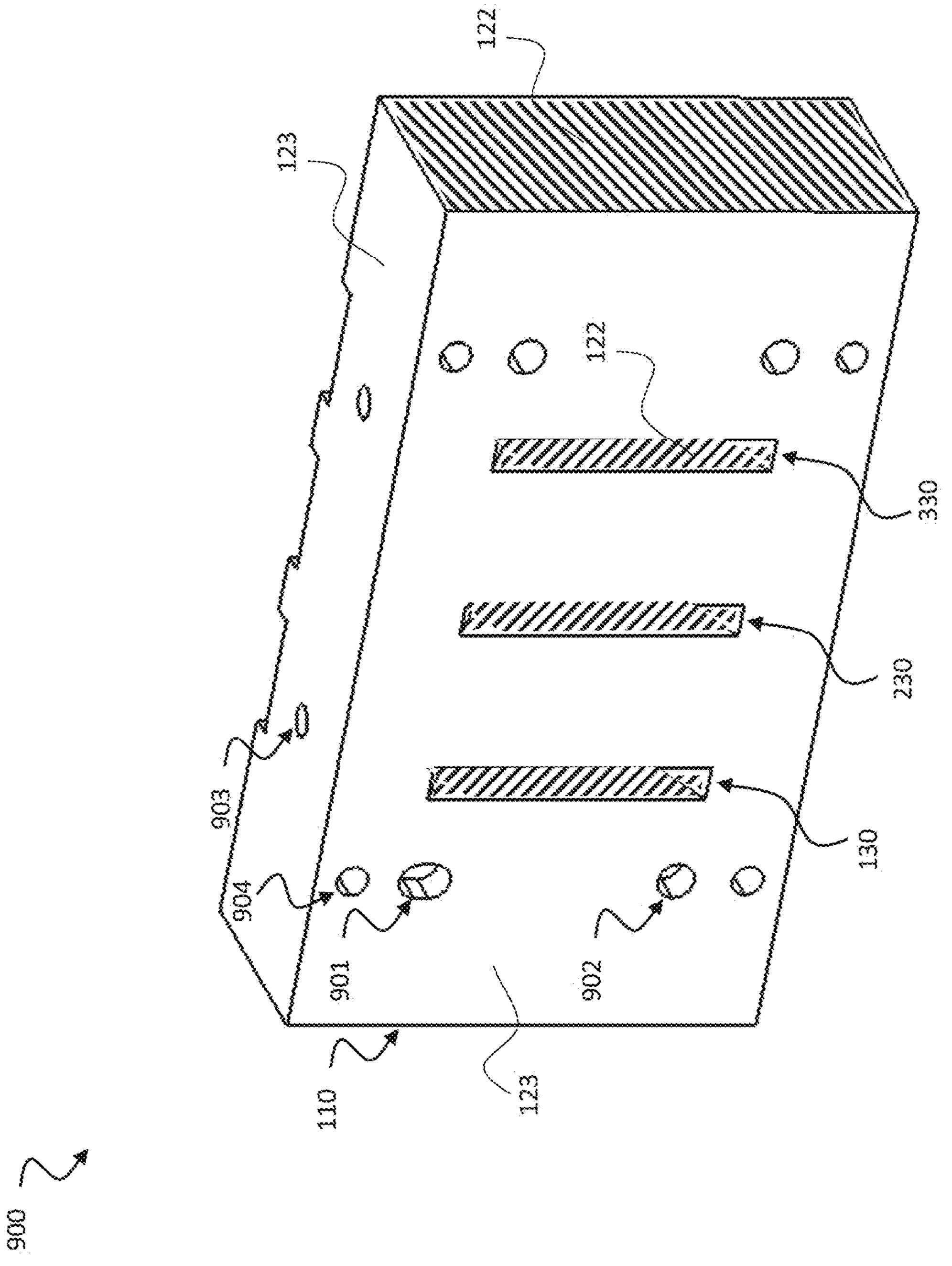
FIG. 9 shows a front view of a horn antenna device 900 according to the disclosure having an exemplary number of three horn antennas placed side-by-side.

FIG. 9 shows a front view of a horn antenna device 900 according to the disclosure having an exemplary number of three horn antennas, for example transmitting horn antennas, placed side-by-side. The horn antenna device 900 may correspond to the horn antenna device 100 described above with respect to FIG. 1 or to the horn antenna device 200 described above with respect to FIG. 2, but it includes multiple horn antennas 130, 230, 330 placed side-by-side in the plastic body 110. In FIG. 9 an exemplary number of three horn antennas is shown, but the number can be any other integer number.

The horn antenna device 900 comprises a plurality of holes 901, 902, 903, 904, configured to: align the plastic body 110 with a predefined positioning of the plastic body 110 on a printed circuit board 150, e.g. a PCB 150 as shown in FIGS. 1 and 2, fix the plastic body 110 on the predefined positioning on the printed circuit board 150 by mechanical fastening, and/or fix a mask on the plastic body 110 for obtaining the partially coating of the plastic body 110 with the metal layer 122 during a metallization process.

To obtain the antenna system, e.g., the antenna system 800 described above with respect to FIG. 8, the first step is the realization of the plastic block 110 in which the horn antennas 130, 230, 330 are formed.

As described above, a number of holes 901, 902, 903, 904 can be included in the plastic block 110, as it can be seen in the picture. The function of the holes is the following: 1) Holes for the alignment pins, to assure the correct antenna positioning on the PCB; 2) Holes for screws, to fix the antenna on the PCB; 3) Holes for the screws to fix a plastic mask on the block. The plastic mask may be required to obtain only a partial coating during the metallization process: The mask covers the surface that should not contain the metal coating.

Only the holes on the bottom side have been described, but the same structures can be also found on the top side of the antenna.

Figure 10:
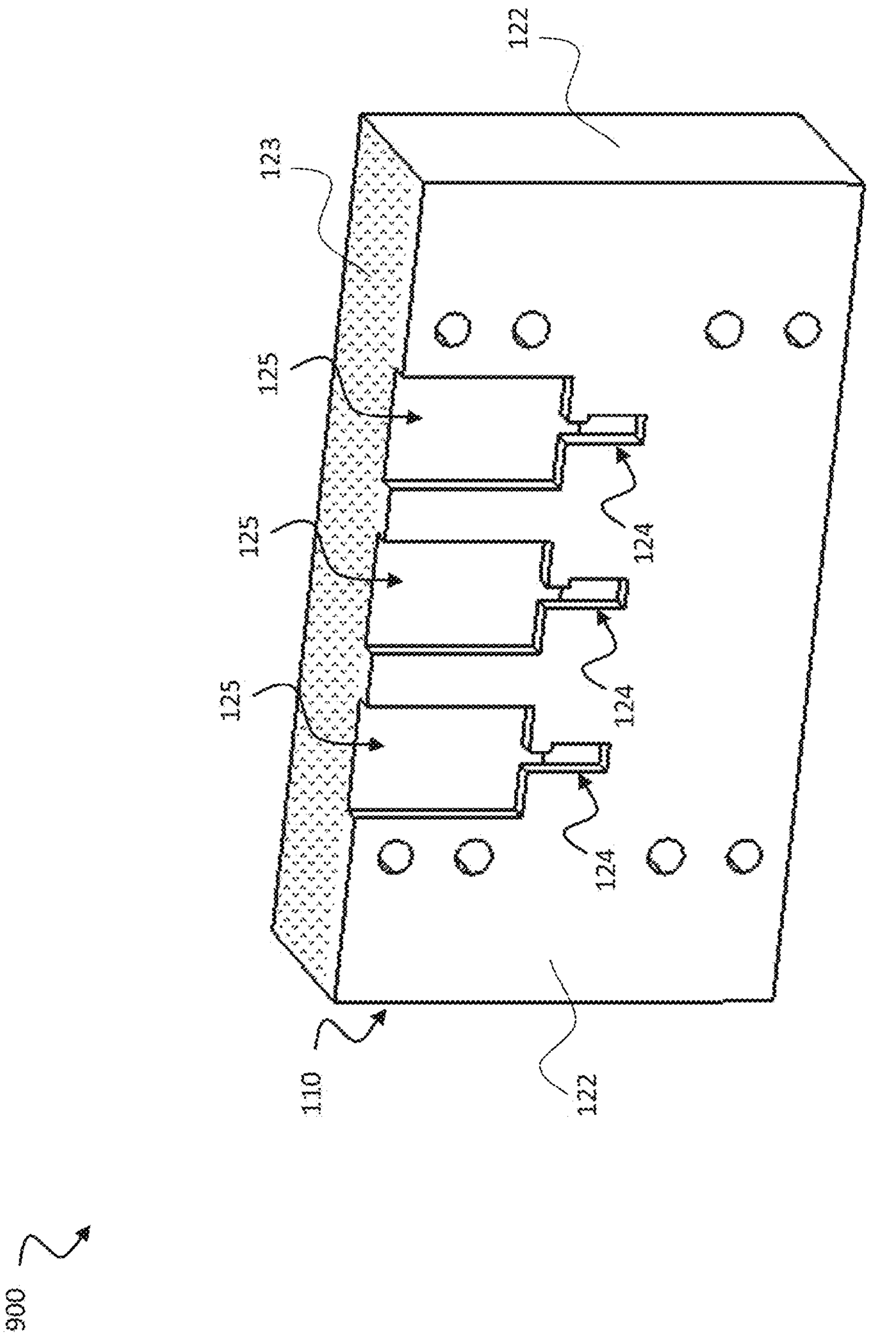
FIG. 10 shows a bottom view of the horn antenna device 900 shown in FIG. 9.

After the metallization process, the metal coating can be observed on the antenna surface as depicted in FIGS. 9 and 10.

FIG. 10 shows a bottom view of the horn antenna device 900 shown in FIG. 9.

The full metallization 122 on the bottom part of the antenna may be necessary to realize a proper transition from the waveguide mode, required to feed the horn antenna, to the microstrip mode, required for the propagation along the feeding network.

As can be seen from FIG. 10, the cavity 120 in the plastic body 110 comprises bottom cavity openings 124 formed at the bottom face 112 of the plastic body 110 to feed the horn antennas 130, 230, 330 with a respective radiation signal.

As described above with respect to FIG. 1, the plastic body 110 comprises a respective groove 125 formed at the bottom face 112 for each horn antenna 130, 230, 330. Each of the three grooves 125 may be required for a respective microstrip-to-waveguide transition.

Figure 11:
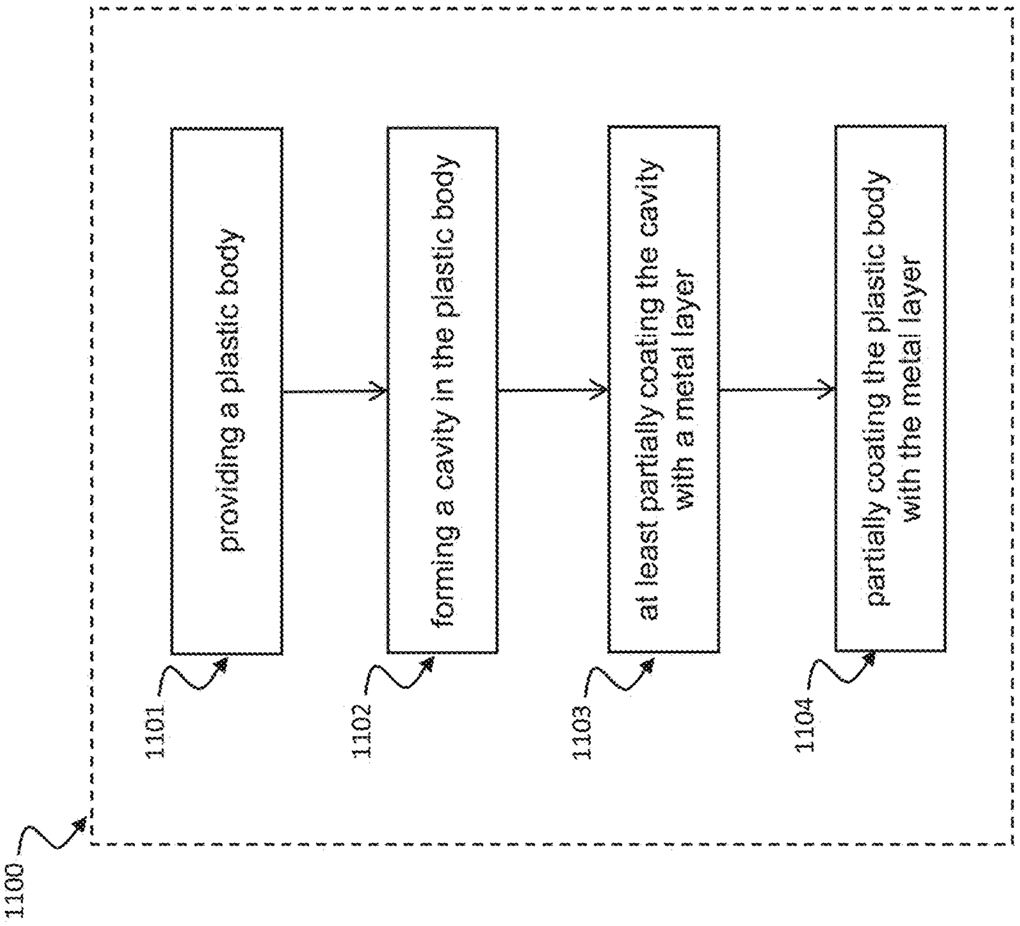
FIG. 11 shows a schematic diagram illustrating a method 1100 for producing a horn antenna device according to the disclosure.

FIG. 11 shows a schematic diagram illustrating a method 1100 for producing a horn antenna device according to the disclosure, e.g., a horn antenna device 100 shown in one of FIG. 1, 2, 6A, 6B, 7, 9 or 10.

The method 1100 comprises: providing 1101 a plastic body comprising a top face, a bottom face opposing the top face and lateral faces adjoining the top face and the bottom face, e.g. as described above with respect to FIG. 1.

The method 1100 comprises: forming 1102 a cavity in the plastic body, wherein the cavity comprises a cavity opening formed at the top face of the plastic body, e.g. as described above with respect to FIG. 1.

The method 1100 comprises: at least partially coating 1103 the cavity with a metal layer to form a horn antenna for radiating microwaves through the cavity opening, e.g. as described above with respect to FIG. 1.

The method 1100 comprises: partially coating the plastic body with the metal layer, the metal layer being configured to define a radiation characteristic of the horn antenna, e.g. as described above with respect to FIG. 1.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A horn antenna device, comprising:

a plastic body comprising a top face, a bottom face opposing the top face, and lateral faces adjoining the top face and the bottom face; and a cavity formed in the plastic body, wherein the cavity comprises a cavity opening formed at the top face of the plastic body, wherein the cavity is at least partially coated with a metal layer to form a horn antenna for radiating microwaves through the cavity opening;

wherein a first portion of the lateral faces is coated with a metal layer, and a second portion of the lateral faces is exposed with plastic of the plastic body, wherein the first portion of the lateral faces substantially blocks radiation within the plastic body and the second portion of the lateral faces allows radiation to pass through the plastic body.

2. The horn antenna device of claim 1, wherein the radiation from the first portion of the lateral faces interacts with the radiation from the second portion of the lateral faces so that the interacting radiation exhibits a characteristic radiation pattern.

3. The horn antenna device of claim 1, wherein the second portion of the lateral faces attenuates radiation within the plastic body based on dielectric properties of the plastic of the plastic body.

4. The horn antenna device of claim 1, wherein a minimum size of ripples in an azimuth plane of the horn antenna is determined based on the first portion of the lateral faces.

5. The horn antenna device of claim 1, wherein a minimum mutual coupling of the horn antenna with an adjacent horn antenna is determined based on the first portion of the lateral faces.

6. The horn antenna device of claim 1, wherein the bottom face of the plastic body is coated with a metal layer; and wherein the top face is exposing plastic of the plastic body without any metallization.

7. The horn antenna device of claim 1, wherein the cavity in the plastic body comprises a bottom cavity opening formed at the bottom face of the plastic body to feed the horn antenna with a radiation signal.

8. The horn antenna device of claim 7, wherein the plastic body comprises a groove formed at the bottom face, the groove extending from the bottom cavity opening towards one of the lateral faces, the groove forming a rectangular waveguide section.

9. The horn antenna device of claim 1, wherein the plastic body is shaped in a form of a box comprising the top face, the bottom face, and four lateral faces.

10. The horn antenna device of claim 1, further comprising:

at least one second cavity formed in the plastic body, wherein the at least one second cavity comprises a second cavity opening formed at the top face of the plastic body, wherein the at least one second cavity is at least partially coated with a metal layer to form at least one second horn antenna for radiating microwaves through the second cavity opening, wherein the at least one second horn antenna is placed side by side with the horn antenna in the plastic body.

11. The horn antenna device of claim 10, wherein the at least one second horn antenna is placed laterally offset to the horn antenna in the plastic body.

12. The horn antenna device of claim 10, further comprising:

a plastic wall formed at the top face of the plastic body between the second cavity opening of the at least one second cavity and the cavity opening of the cavity, wherein the plastic wall attenuates microwaves radiated from the cavity opening of the cavity and the second cavity opening of the at least one second cavity, thereby suppressing a mutual coupling between the horn antenna and the at least one second horn antenna.

13. The horn antenna device of claim 12, wherein the plastic wall surrounds the second cavity opening of the at least one second cavity; and/or wherein the plastic wall surrounds the cavity opening of the cavity at the top face of the plastic body.

14. The horn antenna device of claim 1, further comprising a plurality of holes, wherein the plurality of holes are configured to:

align the plastic body with a predefined positioning of the plastic body on a printed circuit board; and/or fix the plastic body on the predefined positioning on the printed circuit board by mechanical fastening; and/or fix a mask on the plastic body for obtaining the partially coating of the plastic body with the metal layer during a metallization process.

15. The horn antenna device of claim 1, wherein the horn antenna operates in a radar frequency band covering at least a bandwidth between 76 GHz and 81 GHz.

16. An antenna system, comprising:

a printed circuit board;

at least one first horn antenna device that includes:

a plastic body comprising a top face, a bottom face opposing the top face, and lateral faces adjoining the top face and the bottom face; and a cavity formed in the plastic body, wherein the cavity comprises a cavity opening formed at the top face of the plastic body, wherein the cavity is at least partially coated with a metal layer to form a horn antenna for radiating microwaves through the cavity opening;

wherein a first portion of the lateral faces is coated with a metal layer, and a second portion of the lateral faces is exposed with the plastic of the plastic body, wherein the first portion of the lateral faces substantially blocks radiation within the plastic body and the second portion of the lateral faces allows radiation to pass through the plastic body; and wherein the at least one first horn antenna device is mounted on the printed circuit board, the at least one first horn antenna device being configured as a receiving antenna;

at least one second horn antenna device, the at least one second horn antenna device being configured as a transmitting antenna; and a monolithic microwave integrated circuit (MMIC) placed on the printed circuit board, the MMIC comprising a plurality of transmit channels coupled to the transmitting antenna and a plurality of receive channels coupled to the receiving antenna by feed lines.

17. The antenna system of claim 16, wherein the antenna system is configured to form a multiple-input multiple-output (MIMO) radar system comprising multiple receiving antennas and multiple transmitting antennas.

18. The antenna system of claim 16, wherein the plastic body is shaped in a form of a box comprising the top face, the bottom face, and four lateral faces.

19. The antenna system of claim 16, wherein the at least one second horn antenna device includes:

a second plastic body comprising a second top face, a second bottom face opposing the second top face, and second lateral faces adjoining the second top face and the second bottom face; and a second cavity formed in the second plastic body, wherein the second cavity comprises a second cavity opening formed at the second top face of the second plastic body, wherein the cavity is at least partially coated with a metal layer to form a horn antenna for radiating microwaves through the cavity opening, wherein the second cavity in the second plastic body comprises a second bottom cavity opening formed at the second bottom face of the second plastic body to feed the at least one second horn antenna with a radiation signal.

20. The antenna system of claim 19, wherein the second plastic body comprises a second groove formed at the second bottom face, the second groove extending from the second bottom cavity opening towards one of the second lateral faces, the second groove forming a rectangular waveguide section.

* * * * *